US007730410B2

(12) United States Patent
Goering

(10) Patent No.: US 7,730,410 B2
(45) Date of Patent: Jun. 1, 2010

(54) SYSTEM AND METHOD FOR CUSTOMIZING FORM ELEMENTS IN A FORM BUILDING APPLICATION

(75) Inventor: Thomas Goering, Wiesloch (DE)

(73) Assignee: SAP AG, Walldorf (DE)

(*) Notice: Subject to any disclaimer, the term of this patent is extended or adjusted under 35 U.S.C. 154(b) by 956 days.

(21) Appl. No.: 10/665,258

(22) Filed: Sep. 22, 2003

(65) Prior Publication Data

US 2005/0065933 A1 Mar. 24, 2005

(51) Int. Cl.
*G06F 3/00* (2006.01)
(52) U.S. Cl. .................. 715/741; 715/745; 715/751; 715/762; 715/707
(58) Field of Classification Search .......... 715/744, 715/741
See application file for complete search history.

(56) References Cited

U.S. PATENT DOCUMENTS

| | | | |
|---|---|---|---|
| 6,425,121 B1 * | 7/2002 | Phillips | 717/109 |
| 6,529,905 B1 * | 3/2003 | Bray et al. | 707/8 |
| 7,134,084 B1 * | 11/2006 | Rashid et al. | 715/762 |
| 7,404,141 B1 * | 7/2008 | Giljum et al. | 715/234 |
| 2003/0020746 A1 * | 1/2003 | Chen et al. | 345/741 |
| 2003/0048301 A1 * | 3/2003 | Menninger | 345/764 |
| 2003/0083995 A1 * | 5/2003 | Ramachandran et al. | 705/52 |
| 2004/0003353 A1 * | 1/2004 | Rivera et al. | 715/530 |
| 2004/0017392 A1 * | 1/2004 | Welch | 345/738 |
| 2004/0217985 A9 * | 11/2004 | Ries et al. | 345/740 |
| 2006/0230046 A1 * | 10/2006 | Brassil et al. | 707/100 |
| 2008/0000964 A1 * | 1/2008 | Flake et al. | 235/380 |

\* cited by examiner

*Primary Examiner*—Ryan F Pitaro
(74) *Attorney, Agent, or Firm*—Kenyon & Kenyon LLP

(57) ABSTRACT

A method and system for customizing form elements in a form building application. According to one embodiment, a form builder receives an identification of a user of the form building application, the form building application providing a graphical user interface for the manipulation of a set of form elements, and enables access to a subset of the form elements according to authorization rules, and an access manager determines the authorization rules associated with the user.

23 Claims, 6 Drawing Sheets

SYSTEM AND METHOD FOR CUSTOMIZING FORM ELEMENTS IN A FORM BUILDING APPLICATION

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

Electronic forms serve an integral role in organizing information flow for today's business applications. Such forms are widely used to manage and present business data for such enterprise business applications as Customer Relationship Management (CRM), Sales and Distribution (SD), Financial Accounting (FI) and Human Resources (HR). To reduce the amount of programming skills necessary for creating and maintaining these forms, development tools have been created to enable users to design the look-and-feel of business forms in a graphical environment without coding. One such tool is the Smart Forms Form Builder application provided by SAP AG, Walldorf, Germany.

The graphical user interface (GUI) of the currently available Smart Forms Form Builder tool is depicted in FIG. 1. The GUI comprises three sections: navigation tree 100, maintenance screen 110 and form painter 120. Navigation tree 100 provides a tree structure of nodes that represent the output elements of the form such as pages, windows, graphics, tables, text areas, etc. Based on the selected node, maintenance screen 110 provides the area for inserting texts, establishing paragraph and character formats, setting up different attributes (fonts, borders, shading, etc.), or drawing tables and templates. Form painter 120 enables users to design the layout of the form.

The root nodes in navigation tree 100 are "Global Settings" and "Pages and windows". "Global Settings" has three directly inferior nodes: "Form attributes", "Form interface" and "Global definitions". Upon selection of the "Form attributes" node, maintenance screen 110 enables the user to set attributes for the entire form, such as language attributes for the translation process, page format, style and default output settings. Upon selection of the "Form interface" node, maintenance screen 110 enables the user to define the parameter interface through which the form retrieves relevant application data from an application program. And upon selection of the "Global definitions" node, maintenance screen 110 enables the user to define variables and/or constants for use throughout the form.

"Pages and windows" has two directly inferior page nodes: "FIRST" and "NEXT". Form painter 120 displays the directly inferior nodes of the "FIRST" page node, which include one graphic node ("MYSAPCOM") and four window nodes ("MAIN", "ADDRESS", "INFO" and "FOOTER"). "MAIN" includes two text nodes ("INTRODUCTION" AND "GREETINGS") and a table node ("TABLE").

Currently, users of form building applications have unrestricted access to create or edit any node in a form. However, companies may desire to restrict a user's access to particular nodes within a form for which the user is responsible. For example, one division of a company may be solely responsible for the design of the corporate logo for the form, while a second division may be responsible for defining the form interface, and a third division is assigned to process the form content.

Accordingly, there is a need in the art for a system and method that controls access to particular form elements within a form building application.

SUMMARY OF THE INVENTION

Embodiments of the present invention provide for customizing form elements in a form building application. According to one embodiment, a form builder receives an identification of a user of the form building application, the form building application providing a graphical user interface for the manipulation of a set of form elements, and enables access to a subset of the form elements according to authorization rules, and an access manager determines the authorization rules associated with the user.

DETAILED DESCRIPTION

Overview

Figure 1:
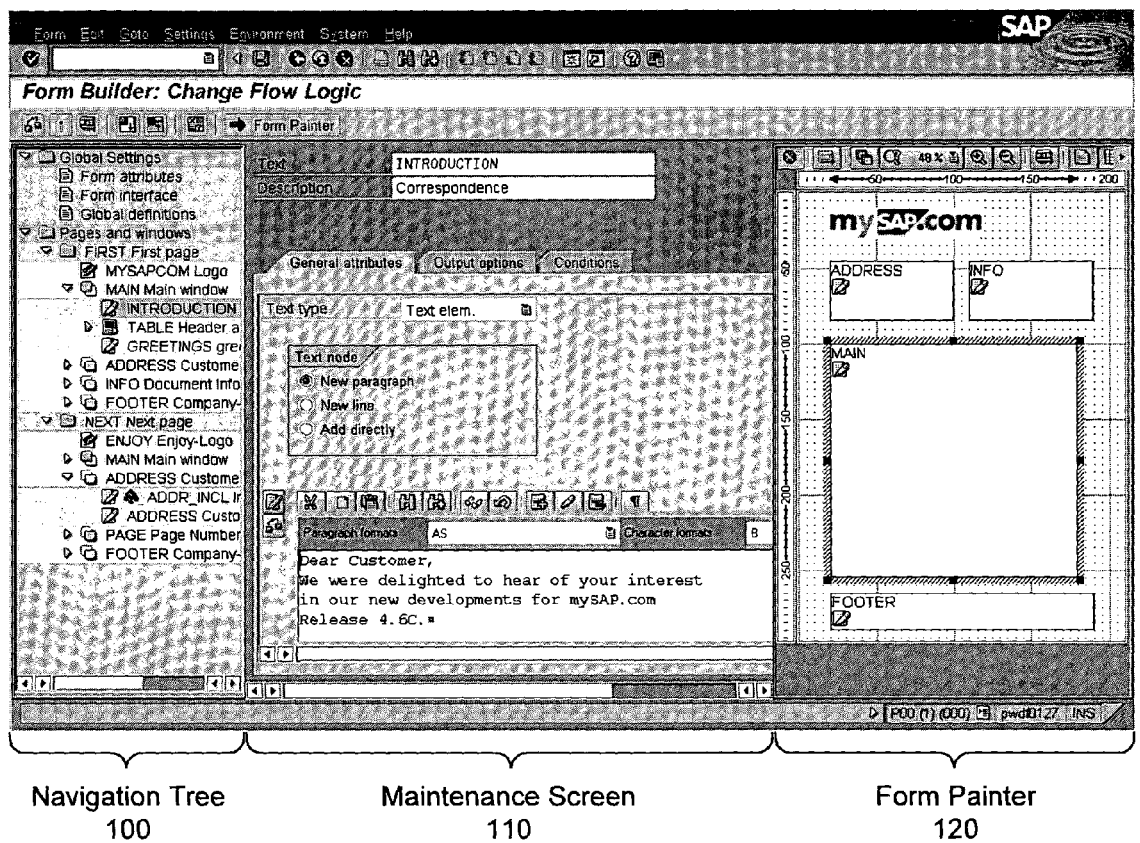
FIG. 1 is a screen shot of a form building application as known in the art.
Figure 2:
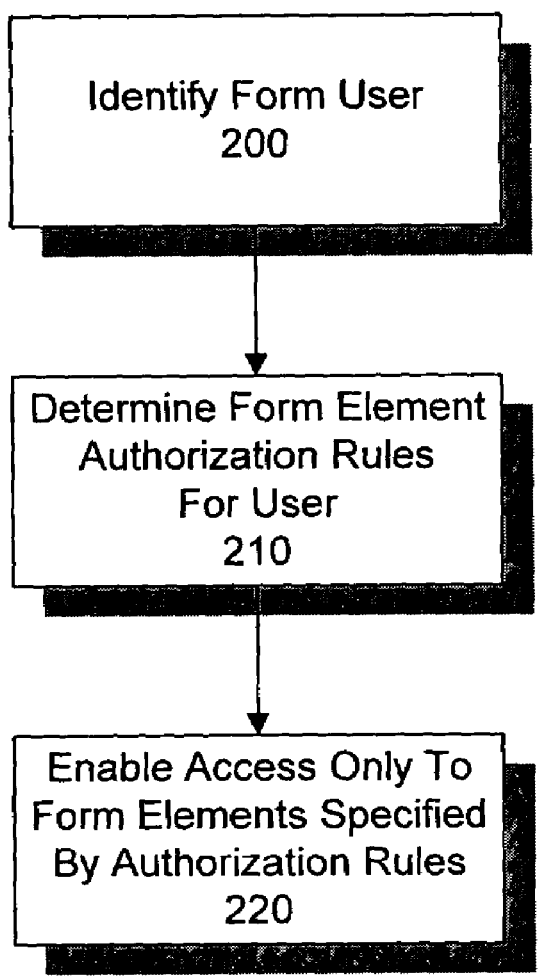
FIG. 2 is a flow chart that depicts a process for reusing form elements in a form-based application runtime environment in accordance with an embodiment of the present invention.

FIG. 2 depicts a process for implementing customizable form elements in accordance with an embodiment of the present invention. In a form-based development environment, when a form developer logs in to a form building application, the form building application first identifies the user based on the login information (step 200). With this identification information, the form building application determines the particular authorization rules associated with user (step 210), and enables access only to the form elements specified by the authorization rules (step 220).

Embodiments described below illustrate a form-based development environment within which the present invention may be implemented.

Architecture

Figure 3:
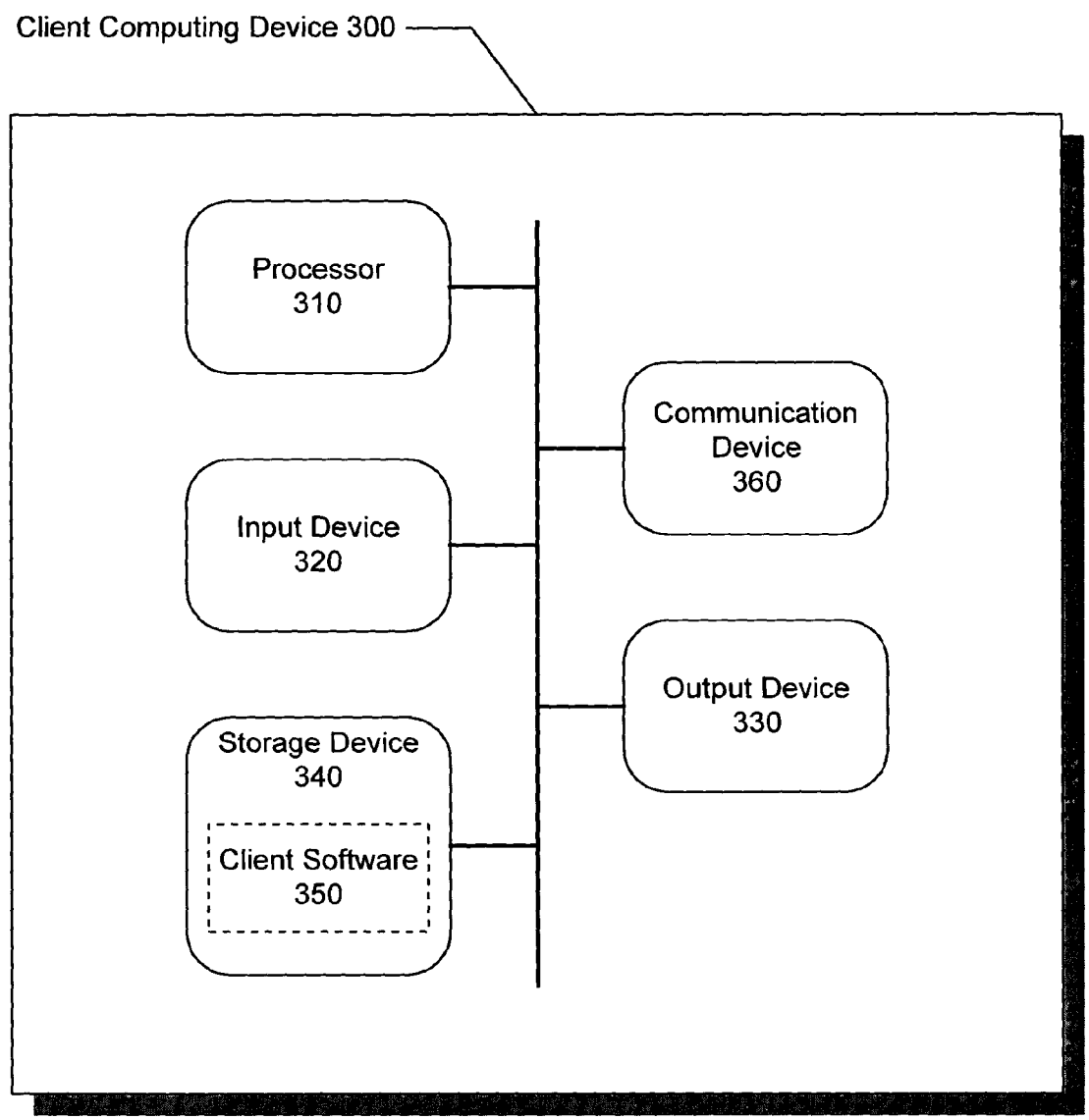
FIG. 3 is a block diagram that depicts a client computing device in accordance with an embodiment of the present invention.
Figure 4:
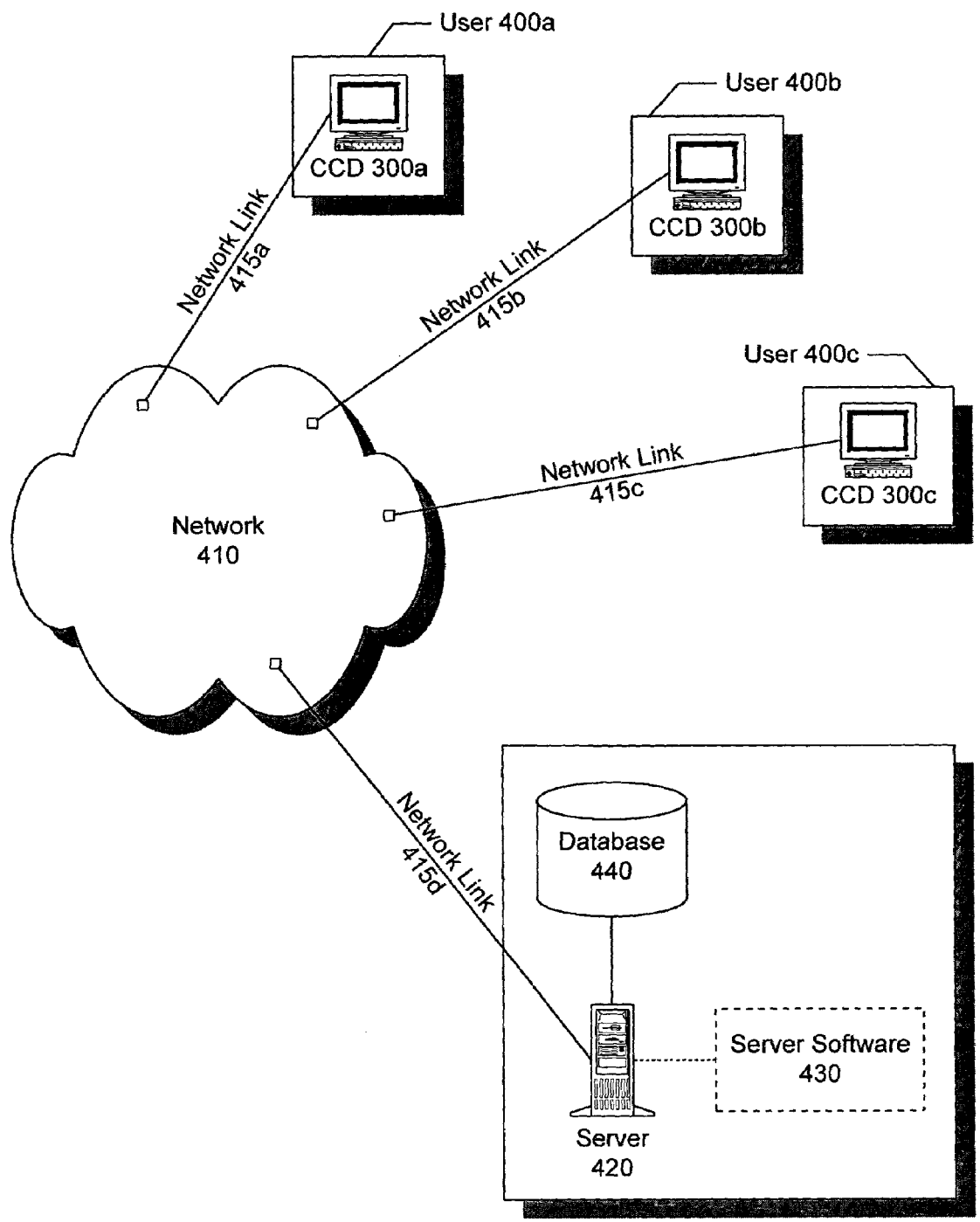
FIG. 4 is a block diagram that depicts a network architecture for a form-based application runtime environment in accordance with an embodiment of the present invention.

FIGS. 3 and 4 illustrate the components of a basic development environment in accordance with an embodiment of the present invention. FIG. 3 depicts client computing device 300, which may be a workstation, personal computer, handheld personal digital assistant ("PDA"), or any other type of microprocessor-based device. Client computing device 300 may include a processor 310, input device 320, output device 330, storage device 340, client software 350, and communication device 360.

Input device 320 may include a keyboard, mouse, pen-operated touch screen, voice-recognition device, or any other device that accepts input. Output device 330 may include a monitor, printer, disk drive, speakers, or any other device that provides output.

Storage device 340 may include volatile and nonvolatile data storage, including one or more electrical, magnetic or optical memories such as a RAM, cache, hard drive, CD-ROM drive, tape drive or removable storage disk. Communication device 360 may include a modem, network interface card, or any other device capable of transmitting and receiving signals over a network. The components of client computing device 300 may be connected via an electrical bus or wirelessly.

Client software 350 may be stored in storage device 340 and executed by processor 310, and may include, for example, the client side of a client/server application such as a form building application like Smart Forms that embodies the functionality of the present invention.

FIG. 4 illustrates a network architecture for a development environment in accordance with an embodiment of the present invention. According to one particular embodiment, when user 400a invokes a form building application, client software 350 of client computing device 300a communicates with server software 430 (e.g., the server side of the form building application) of server 420 via network link 415a, network 410, and network link 415d.

Network link 415 may include telephone lines, DSL, cable networks, T1 or T3 lines, wireless network connections, or any other arrangement that implements the transmission and reception of network signals. Network 410 may include any type of interconnected communication system, and may implement any communications protocol, which may secured by any security protocol.

Server 420 includes a processor and memory for executing program instructions, as well as a network interface, and may include a collection of servers. In one particular embodiment, server 420 may include a combination of enterprise servers such as an application server and a database server. Database 440 may represent a relational or object database, and may be accessed via a database server.

Client computing device 300 and server 420 may implement any operating system, such as Windows or UNIX. Client software 350 and server software 430 may be written in any programming language, such as ABAP, C, C++, Java or Visual Basic. Server software 440 may be built on an enterprise application platform, such as SAP Web Application Server 6.2.

Form Element Customization

Figure 5:
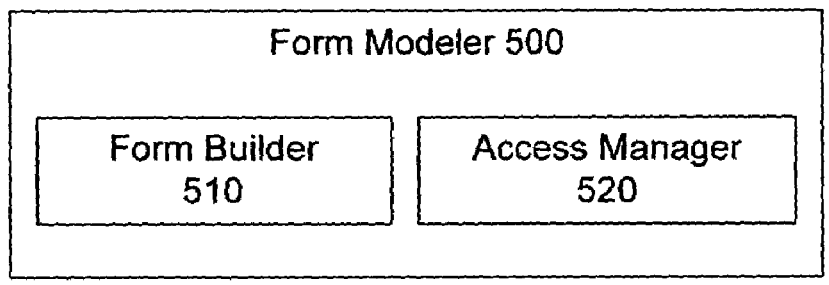
FIG. 5 is a block diagram of a form-based development environment in accordance with an embodiment of the present invention.

Within a form-based development environment as illustrated in FIG. 5, an embodiment of the present invention may be implemented to enable access manager 520 to associate form users with authorization rules so that only the appropriate form elements are provided to the form user by form builder 510 for manipulation.

Form modeler 500 may include several components, such as form builder 510 and access manager 520, that may implement particular functionality associated with the customization of form elements. Form modeler 500 may be connected to some form of storage, such as database 440 or file system storage (local and/or remote).

According to this embodiment, form builder 510 receives identification information from a form user in the form of the user's login information to a form building application. Once the login information is received, access manager 520 references a lookup table (e.g., form definition table or file) to determine which authorization rules are associated with the user. The authorization rules may be a permission list of settings that identify a subset of form elements which are viewable and/or changeable by the user. Once the authorization rules are determined, form builder 510 may provide a graphical user interface to the user for the manipulation of only the authorized subset of form elements. This GUI may implement this functionality, for example, by only providing the authorized subset of form elements to the user, or providing all of the form elements to the user and disabling, or freezing, the unauthorized form elements. Changes to authorization rules may be made by a system administrator.

In another embodiment, form builder 510 may provide a GUI to the user that displays all form elements of a particular form. Whenever the user issues a command to change a particular form element (e.g., via selecting with input device 320 an element to be changed), access manager 520 accesses the permission list to determine whether the user is allowed to change the particular form element, and if not, rejects the user's command to change the form element (e.g., by disabling, or freezing, the unauthorized form element).

Customizable Form Element Representation

Figure 6:
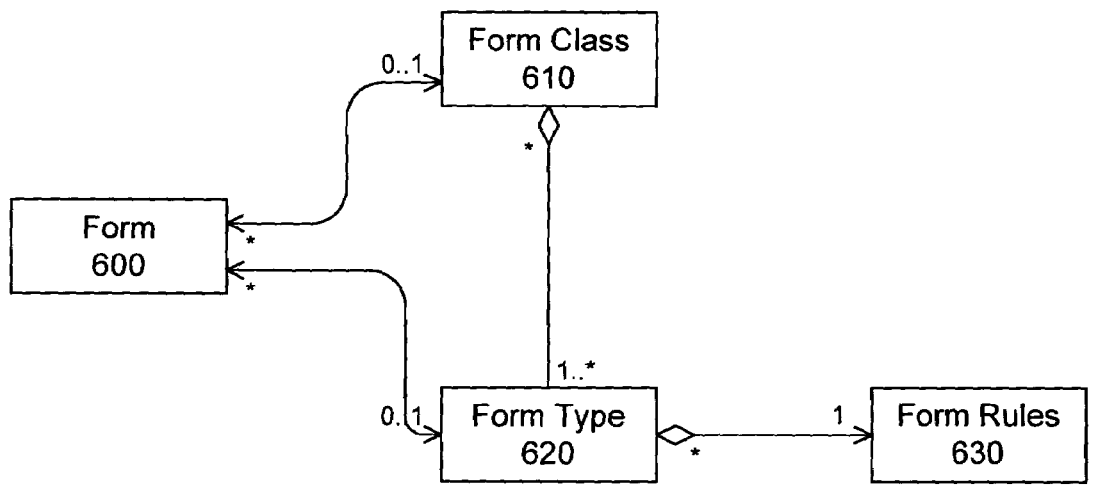
FIG. 6 is a UML class diagram for reusable form elements in accordance with an embodiment of the present invention.

FIG. 6 illustrates a UML class diagram representing one possible organization of customizable form elements in accordance with an embodiment of the present invention. According to this embodiment, form rules 630 includes specific authorizations for the customizable form elements. Form type 620 is a collection of form rules 630, while form class 610 is a collection of form type 620. Form 600 may include zero or one form class 610 or form type 620.

To illustrate by means of an example, suppose a form is going through a development process in different departments of a company. Each department may only be allowed to change particular elements of the form. For example, department A may be responsible for the form's corporate identity (fonts, layout, etc.), department B may be responsible for the form's interface to the application program, and department C may be responsible for developing the form content itself (texts, tables, etc.). Supposing the form represents an order, for example, there could be a form class (610) "Order" with three form types (620) "Corporate Identity", "Application Interface" and "Form Development". Form type "Corporate Identity" may contain special form rules (630) so form builder 510 only allows the change of the form layout and the styles for the texts. Form type "Application Interface" may contain special form rules so form builder 510 only allows changes to the form interface. Finally, form type "Form Development" may contain form rules so form builder 510 allows changes to everything except what the previous form rules are allowing. Using this embodiment, departments may hand over the form to the next department in the development process by changing the form type for the next department.

A system administrator may define access rights based on any distinction, such as user id, job title, department code, position in the corporate hierarchy, etc.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer system for customizing form elements under development in a form building application, comprising:

a processor executing program instructions, the executed program instructions instantiating:
  a form builder component configured to receive an identification of a user of the form building application, the form building application providing a graphical user interface for manipulating a set of form elements under development, the form elements including an element for global attributes of the form including the layout of the form, the form building application configured to display the set of form elements separate from the form, the form elements indicating authorization for the user to develop the form element when the form element is accessible to the user, and to enable access to the user for developing a subset of the form elements according to an access manager, and
  authorization rules permitting the selection of form elements wherein the authorization rules identify the subset of the form elements accessible to the user independent of any data in the form elements via a lookup table separate from the form, the lookup table containing the authorization rules, and the access manager component configured to retrieve the authorization rules associated with the user's authorization to develop the set of form elements using the user identification and configured to enable access to the user for developing the form elements according to the authorization rules.

2. The system of claim 1, wherein the identification of the user is based on login information.

3. The system of claim 1, wherein the subset of form elements accessible to the user is determined solely via the lookup table.

4. The system of claim 1, wherein the authorization rules include settings that identify the subset of the form elements which are viewable and/or changeable.

5. The system of claim 1, wherein the form building application is configured to display only the set of form elements that the user is authorized to modify.

6. The system of claim 1, wherein the form elements indicate authorization for the user to develop the form element visually by being at least one of: enabled, unfrozen, and displayed in the form building application.

7. The system of claim 1, wherein the authorization rules include settings that identify the subset of the form elements accessible to the user based on the form element itself independent of any data contained in the form element.

8. The system of claim 1, further comprising:
  giving authorization to all form elements to a first user of the electronic form; and
  for each successive user of the electronic form only giving authorization to those form elements to the successive user that have not yet been edited.

9. A computer-implemented method for customizing form elements under development in a form building application, comprising:
  in response to receiving an identification of a user of the form building application,
  the form building application providing a graphical user interface for manipulating a set of form elements under development, the form elements including an element for global attributes of the form including the layout of the form;
  retrieving authorization rules associated with the user's authorization to develop the set of form elements, using the user identification;
  displaying the set of form elements separate from the form, the form elements indicating the authorization for the user to develop the form element when the form element is accessible to the user; and
  enabling access to the user for developing a subset of the form elements through a lookup table separate from the form where the lookup table contains authorization rules associated with the user identification identifying the subset of form elements accessible to the user independent of any data in the form elements.

10. The method of claim 9, wherein the identification of the user is based on login information.

11. The method of claim 9, wherein the subset of form elements accessible to the user is determined solely via the lookup table.

12. The method of claim 11, wherein the authorization rules include settings that identify the subset of the form elements which are viewable and/or changeable.

13. The method of claim 9, further comprising:
  giving authorization to all form elements to a first user of the electronic form; and
  for each successive user of the electronic form only giving authorization to those form elements to the successive user that have not yet been edited.

14. A computer-implemented method for customizing an electronic form including form elements under development, comprising:
  displaying a set of form elements separate from the electronic form, the form elements indicating the authorization for the user to develop the form element;
  responsive to a command by a user to change an element of the form under development, retrieving a permission list from a lookup table separate from the form using an identifier associated with the user, the permission list identifying access rights for developing a plurality of form elements contained in the form independent of any data in the form elements, the form elements including an element for global attributes of the electronic form including the layout of the electronic form;
  comparing the identifier associated with the user to the access rights for the form element to be changed through the lookup table separate from the form; and
  rejecting the command unless the access rights associated with the user's identifier permit the user to change the form element.

15. The method of claim 14, wherein the command by the user to change the form element includes selecting in a form building application a node representing the form element.

16. The method of claim 14, wherein the access rights are defined for form elements representing a form's corporate identity.

17. The method of claim 14, wherein the access rights are defined for form elements representing a form's interface to an application program.

18. The method of claim 14, wherein the access rights are defined based on at least one of user id, job title, department code and position in the corporate hierarchy.

19. The method of claim 14, further comprising:
  giving authorization to all form elements to a first user of the electronic form; and
  for each successive user of the electronic form only giving authorization to those form elements to the successive user that have not yet been edited.

20. A computer system for customizing form elements under development in a form building application, comprising:
  a processor executing program instructions, the executed program instructions instantiating:

a form builder component configured to receive an identification of a user of the form building application, the form building application providing a graphical user interface for manipulating a set of form elements under development, the form elements including an element for global attributes of the form including the layout of the form, the form building application configured to display the set of form elements separate from the form, the form elements visually indicating authorization for the user to develop the form element when the form element is accessible to the user, and to enable access to the user for developing a subset of the form elements according to an access manager, and authorization rules permitting the selection of form elements wherein the authorization rules identify the subset of the form elements accessible to the user independent of any data in the form elements through a lookup table separate from the form, the lookup table containing authorization rules for each form element and the access manager component configured to retrieve the authorization rules associated with the user's authorization to develop the set of form elements using the user identification and configured to enable access to the user for developing the form elements according to the authorization rules.

21. The system of claim 20, further comprising:

giving authorization to all form elements to a first user of the electronic form; and for each successive user of the electronic form only giving authorization to those form elements to the successive user that have not yet been edited.

22. A computer-implemented method for customizing form elements under development in a form building application, comprising:

responsive to receiving an identification of a user of the form building application, the form building application providing a graphical user interface for manipulating a set of form elements under development, the form elements including an element for global attributes of the form including the layout of the form, retrieving authorization rules associated with the user's authorization to develop the set of form elements, using the user identification;

displaying at least one form element separate from the form, the displayed form element indicating to the user the authorization for the user to develop the form element based on the authorization rules; and enabling access to the user for developing a subset of the form elements through a lookup table separate from the form where the lookup table contains the authorization rules associated with the user identification, the lookup table being configured to identify the subset of form elements accessible to the user independent of data in the form and the form elements.

23. The method of claim 22, further comprising:

giving authorization to all form elements to a first user of the electronic form; and for each successive user of the electronic form only giving authorization to those form elements to the successive user that have not yet been edited.

* * * * *